(12) United States Patent
Yu et al.

(10) Patent No.: US 10,859,152 B2
(45) Date of Patent: Dec. 8, 2020

(54) PURE ELECTRIC VEHICLE TRANSMISSION WITH NOVEL LUBRICATION STRUCTURE

(71) Applicant: ZHEJIANG XIN PRECISION MACHINERY CO., LTD., Zhejiang (CN)

(72) Inventors: Wenyong Yu, Zhejiang (CN); Akihiro Nakao, Zhejiang (CN); Jianhua Jin, Zhejiang (CN)

(73) Assignee: ZHEJIANG XIN PRECISION MACH CO., LTD., Zhejiang (CN)

( * ) Notice: Subject to any disclaimer, the term of this patent is extended or adjusted under 35 U.S.C. 154(b) by 177 days.

(21) Appl. No.: 15/810,265

(22) Filed: Nov. 13, 2017

(65) Prior Publication Data

US 2019/0145509 A1 May 16, 2019

(51) Int. Cl.
*F16H 57/04* (2010.01)

(52) U.S. Cl.
CPC ..... *F16H 57/0457* (2013.01); *F16H 57/0421* (2013.01); *F16H 57/0475* (2013.01); *F16H 2700/02* (2013.01)

(58) Field of Classification Search
CPC ............. F16H 57/0457; F16H 57/0421; F16H 57/0475
See application file for complete search history.

(56) References Cited

U.S. PATENT DOCUMENTS

| | | | | |
|---|---|---|---|---|
| 2,938,601 A * | 5/1960 | Brafford | ............... | F01M 11/065 184/103.1 |
| 3,529,698 A * | 9/1970 | Nelson | ..................... | B61C 17/08 184/6.12 |
| 4,270,497 A * | 6/1981 | Valerio | ............... | F01M 11/0004 123/195 C |
| 4,519,348 A * | 5/1985 | Hamilton | ........... | F01M 11/0004 123/195 C |
| 4,986,235 A * | 1/1991 | Ishii | .................... | F01M 11/0004 123/195 C |
| 7,213,682 B2 * | 5/2007 | Gibson | ............... | F16H 57/0421 184/6.12 |
| 8,261,883 B2 * | 9/2012 | Ariga | .................. | F16H 57/0423 184/13.1 |
| 8,672,094 B2 * | 3/2014 | Quehenberger | .... | F16H 57/0419 184/6.12 |

(Continued)

*Primary Examiner* — Michael A Riegelman
(74) *Attorney, Agent, or Firm* — Bacon & Thomas, PLLC

(57) ABSTRACT

A pure electric vehicle transmission includes a transmission box, a top side of the transmission box is provided with a temporary oil storage case, a bottom side thereof is stored with lubricating oil, the temporary oil storage case is provided with a plurality of lubricating oil holes, a gear-connected transmission input shaft and an intermediate coupling are located at a lower side of the oil storage case and arranged above a lubricating oil surface, an intermediate coupling gear is connected with a differential gear, a lower side of the differential gear is immersed in the lubricating oil, the lubricating oil at the bottom side of the transmission box is splashed in the temporary oil storage case via the rotation of the differential gear, the lubricating oil lubricates various parts of the transmission through the lubricating oil holes, and then returns to the bottom side of the transmission box to form circulation.

1 Claim, 3 Drawing Sheets

(56) References Cited

U.S. PATENT DOCUMENTS

| | | | | |
|---|---|---|---|---|
| 8,746,405 B2* | 6/2014 | Perakes | F16H 57/0409 184/6.12 |
| 8,899,381 B2* | 12/2014 | Ebihara | B60K 7/0007 184/6.12 |
| 9,772,027 B2* | 9/2017 | Preston | F16H 57/0423 |
| 9,856,971 B2* | 1/2018 | Mikami | F16H 57/0424 |
| 9,897,192 B2* | 2/2018 | Tahara | F16H 57/0409 |
| 2006/0231337 A1* | 10/2006 | Vogeltanz | F16H 57/0447 184/6 |
| 2009/0314580 A1* | 12/2009 | Jabs | F16H 57/0447 184/11.1 |
| 2019/0145509 A1* | 5/2019 | Yu | F16H 57/0457 184/11.1 |
| 2019/0170243 A1* | 6/2019 | Brizendine | F16H 57/0447 |

* cited by examiner

PURE ELECTRIC VEHICLE TRANSMISSION WITH NOVEL LUBRICATION STRUCTURE

FIELD OF THE INVENTION

The present invention belongs to the technical field of transmission, and refers in particular to a pure electric vehicle transmission with a novel lubrication structure.

BACKGROUND OF THE INVENTION

A new energy pure electric vehicle is driven by a motor. Compared with a traditional fuel engine, a rotating speed of a motor during operation may be up to 10,000 rpm, a peak torque is larger, and thus the load and reliability of a transmission gear and bearing are required higher, it needs to ensure that gears and bearings are subjected to the full lubrication, the requirement of the oil is also higher.

If the splashing lubrication is adopted, due to the higher rotating speed of the motor, the churning loss is caused by the high rotating speed of the gear, resulting in the decreased in the transmission efficiency, and shortening the driving mileage of the vehicle; on the other hand, the gear agitation also accelerates the oil aging, which increases maintenance costs, if the dry sump lubrication is adopted, an oil pump needs to be increased, which increases the additional power loss, and sometimes the additional lubricating tubing needs to be added or an lubricating oil passage needs to be opened in the box, which no doubt increases the manufacturing difficulty and manufacturing costs. Therefore, lubrication effects of several lubrication methods cannot play a good lubrication effect, and do not have small power loss.

SUMMARY OF THE INVENTION

The present invention aims at providing a pure electric vehicle transmission with a novel lubricating structure, which overcomes the drawbacks of the prior art, adopts upper transmission arrangement of a high-speed gear shaft, and is additionally provided with an oil baffle plate at the bottom of the box to control the splashing quantity of the lubricating oil. The upper part in a transmission cavity is provided with a temporary oil storage box, collecting the splashing lubricating oil, and then providing the right amount of lubricating oil to the parts through gravity. The whole structure realizes the circulation lubrication of the lubricating oil, and lubricates more uniformly and effectively at the same time, and reduces the manufacturing difficulty of the transmission and saves the cost.

The object of the present invention is realized in this way:

A pure electric vehicle transmission with a novel lubrication structure comprises a transmission box, wherein a top side in the transmission box is provided with a temporary oil storage case, a bottom side thereof is stored with lubricating oil, the temporary oil storage case is provided with a plurality of lubricating oil holes, a gear-connected transmission input shaft and an intermediate coupling are located at a lower side of the oil storage case and arranged above a lubricating oil surface, an intermediate coupling gear is connected with a differential main reduction gear, a lower side of the differential main reduction gear is immersed in the lubricating oil, the lubricating oil at the bottom side of the transmission box is splashed in the temporary oil storage case via the differential main reduction gear, the lubricating oil lubricates various parts of the transmission through the plurality of lubricating oil holes, and then returns to the bottom side of the transmission box to form circulation.

The bottom side of the transmission box is provided with an oil baffle plate, the bottom side of the transmission box is divided into a front oil storage tank and a rear oil storage tank via the oil baffle plate, the oil baffle plate is provided with an oil through hole, and the lower side of the differential main reduction gear is located in the front oil storage tank.

The specific structure of the temporary oil storage case comprises a case body having an opened upper side, a bottom side of the temporary oil storage is provided with a differential pinion lubricating oil hole, a differential main reduction gear surface lubricating oil hole, a first-gear lubricating oil hole in the transmission input shaft and a second-gear lubricating oil hole in the transmission input shaft, and the side of the case body is provided with transmission input shaft and intermediate coupling lubricating oil holes.

The differential pinion lubricating oil hole is formed by a tubular body extending from the bottom of the temporary oil storage case body downward, an oil outlet of a lower end part of the downward-extending tubular body is arranged next to the right above position of the differential pinion, the oil outlet is closer to the differential pinion part needing to lubricate via the structural arrangement of the tubular body, so that the lubricating oil is able to accurately flow to the part needing to lubricate.

The bottom of the temporary oil storage case is further provided with a plurality of avoiding notches, and the plurality of avoiding notches are arranged according to the shape of various gears of the transmission input shaft, the intermediate coupling and the differential. Compared with the prior art, the present invention has the prominent and advantageous technical effect as follows:

1. According to the present invention, the transmission input shaft and the intermediate coupling are arranged upward, the oil consumption of the transmission is controlled to a minimum by using the oil storage case and the oil baffle plate during running, the amount of the lubricating oil is saved, and the lubrication requirement is satisfied; at the same time, it avoids the problem that an oil pump oil delivery pipe is additionally provided in the prior art or the oil supply passage is required to be opened on the box. In addition, the oil hole in the oil storage case also has a greater flexibility, as long as the oil holes are opened in the part needing to be lubricated according to the needs. In addition, through the arrangement of the oil baffle plate, it avoids unnecessary agitation of the lubricating oil, avoids the oil temperature rise, and is conducive to pump lubricating oil up and thrown in the oil storage case for the main reduction gear, so as to ensure the supply of the lubricating oil.

2. The invention can achieve the effect of reducing the amount of lubricating oil during running, reduce the agitation loss of the gear, reduce the power loss during the power transmission and improves the transmission efficiency of the transmission. According to the present invention, as the gears in the transmission input shaft and the intermediate coupling are avoided to agitate the lubricating oil, the temperature of the lubricating oil can be lowered, the durability of the lubricating oil is improved, the maintenance period is prolonged, which is energy-saving and the environmentally friendly, so as to save the maintenance cost. The invention adopts the innovative structural layout and the structural design of the oil storage box, which achieves the stable oil supply of each part of the transmission, thus improving the reliability and service life of the transmission.

According to the present invention, the downward-extending tubular body oil outlet is arranged next to the upper part of the differential pinion, so that the oil hole is closer to the differential pinion part that needs to be lubricated, and thus the lubricating oil can flow to the lubrication parts. It avoids the main reduction gear to drive the air flow agitation, and the lubricating oil cannot accurately flow to the differential pinion for effective lubrication. By providing a plurality of avoiding notches, the overall volume of the transmission is further reduced. On the other hand, the lubricating oil holes in the bottom of the oil storage case are also moved close to the gear meshing parts that need to be lubricated as far as possible, making the lubrication accurate, and quick and effective. In addition, the reduction of the oil storage case is also conducive to throwing the lubricating oil into the oil storage case for the differential main reduction gear, so as to ensure the enough supply of lubricating oil.

DETAILED DESCRIPTION OF THE PREFERRED EMBODIMENTS

Figure 1:
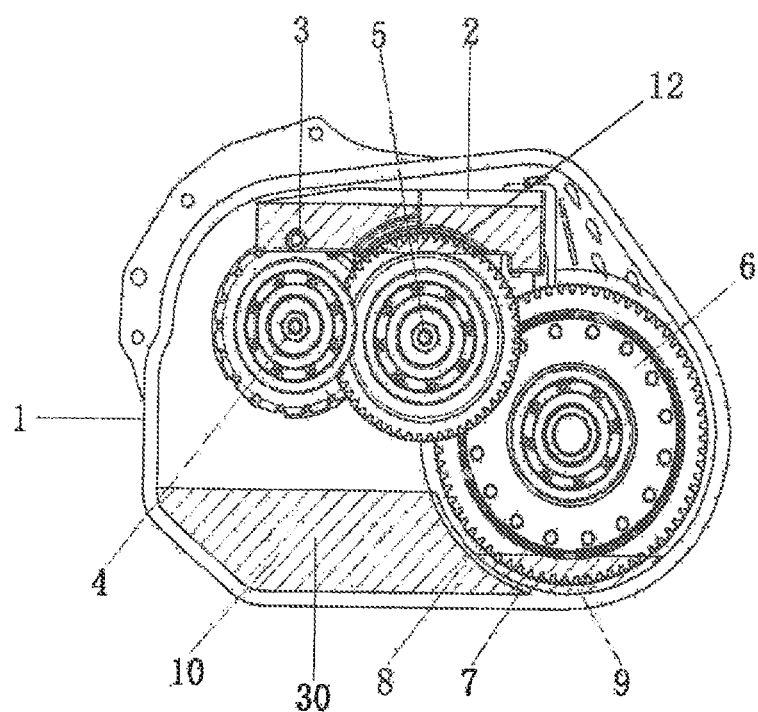
FIG. 1 is a half-profile of the working state of the present invention.
Figure 2:
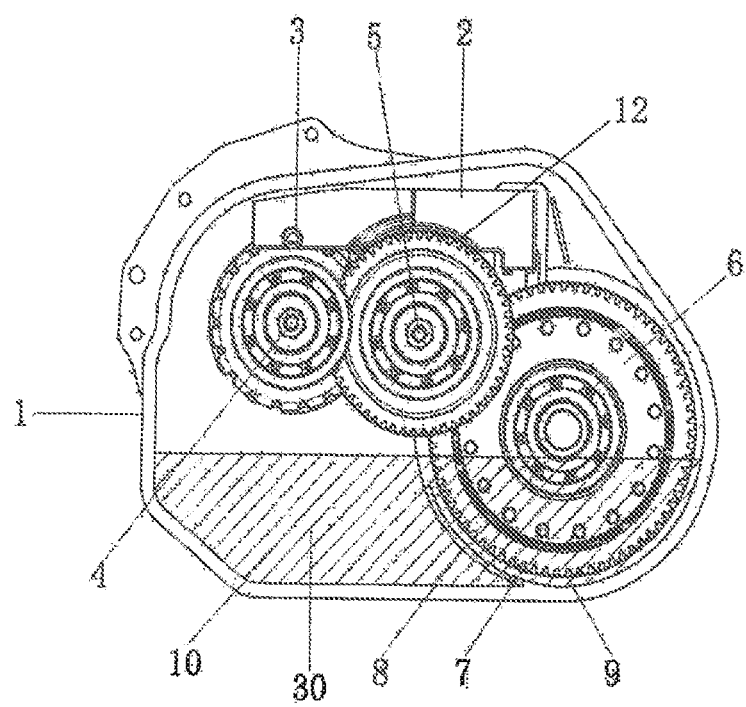
FIG. 2 is a half-profile of the stationary state of the present invention.
Figure 3:
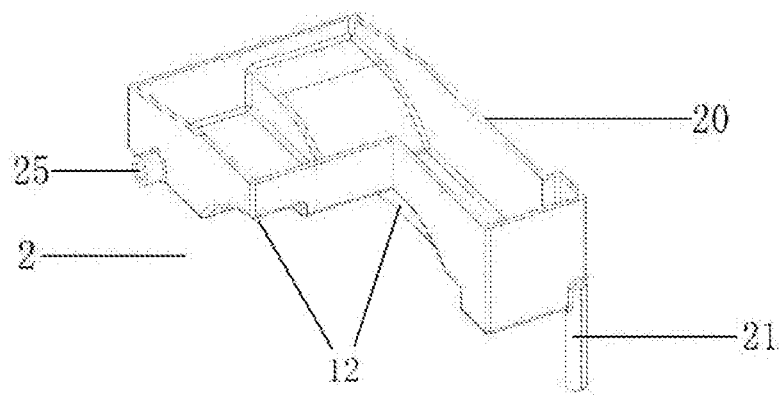
FIG. 3 is a schematic diagram of a solid structure of a temporary oil storage case in the present invention.
Figure 4:
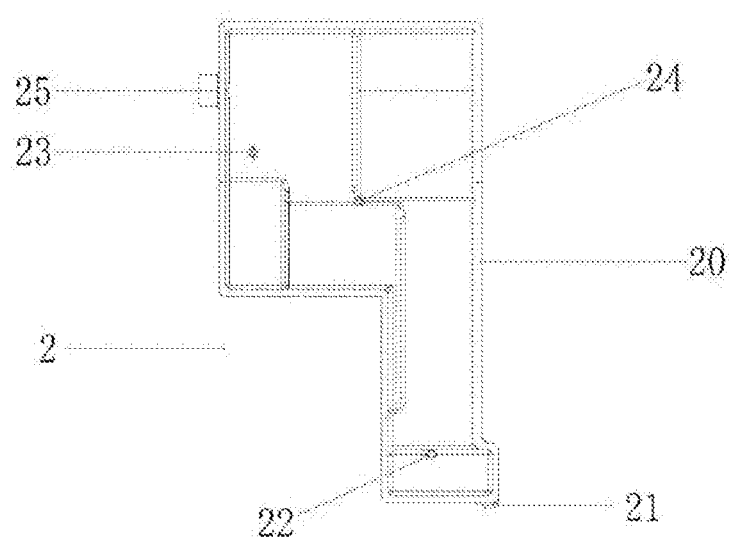
FIG. 4 is a top view of the temporary oil storage case in the present invention.

The present invention is further described with reference to drawings and exemplary embodiments hereinafter: see FIG. 1 to FIG. 4:

A pure electric vehicle transmission with a novel lubrication structure comprises a transmission box 1, wherein a top side in the transmission box is provided with a temporary oil storage case 2, a bottom side thereof is stored with lubricating oil 30, the temporary oil storage case 2 is provided with a plurality of lubricating oil holes 3, a gear-connected transmission input shaft 4 and an intermediate coupling 5 are located at a lower side of the oil storage case 2 and arranged above a lubricating oil surface, an intermediate coupling 5 gear is connected with a differential main reduction gear 6 (or also called as differential external gear ring), a lower side of the differential main reduction gear 6 is immersed in the lubricating oil, the lubricating oil 30 at the bottom side of the transmission box is splashed in the temporary oil storage case 2 via the rotation of the differential main reduction gear 6, the lubricating oil 30 lubricates various parts of the transmission through the plurality of lubricating oil holes 3, and then returns to the bottom side of the transmission box 1 to form circulation.

The bottom side of the transmission box is provided with an oil baffle plate 8, the bottom side of the transmission box is divided into a front oil storage tank 9 and a rear oil storage tank 10 via the oil baffle plate, the oil baffle plate 8 is provided with an oil through hole 7, and the lower side of the differential main reduction gear 6 is located in the front oil storage tank. This arrangement is conducive to reducing the large agitation of the lubricating oil located in the rear oil storage tank 10, avoiding the lubricating oil temperature rise and the differential power loss. In addition, it is also advantageous for the main reduction gear 6 to push the lubricating oil upwardly along the case and thrown into the top temporary oil storage case 2.

The specific structure of the temporary oil storage case 2 comprises a case body 20 having an opened upper side, a bottom side of the case body temporary oil storage case is provided with a differential pinion lubricating oil hole 21, a differential main reduction gear surface lubricating oil hole 22, a first-gear lubricating oil hole 23 in the transmission input shaft and a second-gear lubricating oil hole 24 in the transmission input shaft, and the side of the case body is provided with transmission input shaft and intermediate coupling lubricating oil holes 25.

The differential small gear lubricating oil hole 21 is formed by a tubular body extending from the bottom of the temporary oil storage case body downward, an oil outlet of the downward-extending tubular body is arranged next to the right above position of the differential pinion, for example, the distance difference is 1-2 mesh, the oil outlet is closer to the differential pinion part needing to lubricate via the structure, so that the lubricating oil is able to accurately flow to the part needing to lubricate. If the extended tubular body is not provided, the lubricating oil flows directly downward from the bottom of the case body. As the upper and lower stroke is relatively long, the lubricating oil will be agitated by the differential main reduction gear in the transmission box. The lubricating oil cannot accurately flow to the differential pinion for effective lubrication.

The bottom of the temporary oil storage case 2 is further provided with a plurality of avoiding notches 12, and the plurality of avoiding notches 12 are arranged according to the shape of various gears of the transmission input shaft, the intermediate coupling and the differential. On one hand, the overall volume of the transmission is further reduced; on the other hand, the lubricating oil holes in the bottom of the oil storage case are also moved close to the gear meshing parts needing to be lubricated as far as possible, making the lubrication accurate, quick and effective. In addition, the reduction of the oil storage case is also conducive to throwing the lubricating oil into the oil storage case for the differential main reduction gear, so as to ensure the enough supply of lubricating oil.

The temporary oil storage case is made of a material resistant to high temperature and resistant to grease, such as metal, high temperature resistant grease resin or other materials.

The embodiments as set forth above are the preferred embodiments of the present invention merely, but not intended to limit the protection scope of the present invention. Therefore, various equivalent changes made according to construction, shape and principle of the present invention shall fall within the protection scope of the present invention.

What is claimed is:

1. A pure electric vehicle transmission with a novel lubrication structure, comprising a transmission box, wherein a top side in the transmission box is provided with a temporary oil storage case, a bottom side thereof is stored with lubricating oil, the temporary oil storage case is provided with a plurality of lubricating oil holes, a gear-connected transmission input shaft and an intermediate coupling are located at a lower side of the temporary oil storage case and arranged above a lubricating oil surface, an intermediate coupling gear is connected with a differential main reduction gear, a lower side of the differential main reduction gear is immersed in the lubricating oil, the lubricating oil at the bottom side of the transmission box is splashed into the temporary oil storage case via the rotation of the differential main reduction gear, the lubricating oil lubricates various parts of the transmission through the plurality of lubricating oil holes, and then returns to the bottom side of the transmission box to form circulation; the bottom side of the transmission box is provided with an oil baffle plate, the bottom side of the transmission box is divided into a front oil storage tank and a rear oil storage tank via the oil baffle plate, the oil baffle plate is provided with an oil through hole, the lower side of the differential main reduction gear is located in the front oil storage tank;

a specific structure of the temporary oil storage case comprises a case body having an opened upper side, a bottom side of the temporary oil storage case is provided with a lubricating oil hole of a differential pinion, lubricating oil hole of a differential main reduction gear surface, lubricating oil hole of a first-gear in the transmission input shaft and a lubricating oil hole of second-gear in the transmission input shaft, and the side of the case body is provided with transmission input shaft and lubricating oil holes of an intermediate coupling;

wherein the bottom of the temporary oil storage case is further provided with a plurality of avoiding notches, and the plurality of avoiding notches are arranged according to the shape of various gears of the transmission input shaft, the intermediate coupling and the differential; and wherein the differential pinion lubricating oil hole is formed by a tubular body extending from the bottom of the temporary oil storage case body downward, an oil outlet of a lower end part of the downward-extending tubular body is arranged next to a right top position of the differential pinion, the oil outlet is closer to the differential pinion part needing to lubricate via a structural arrangement of the tubular body, so that the lubricating oil is able to accurately flow to a part needing to lubricate.

\* \* \* \* \*